Nov. 8, 1927.　　　　　　　　　　　　　　　　　1,648,138

K. LAUER

PRECISION INDICATOR

Filed Dec. 9. 1924　　　　3 Sheets-Sheet 1

Nov. 8, 1927. 1,648,138
K. LAUER
PRECISION INDICATOR
Filed Dec. 9, 1924    3 Sheets-Sheet 2

Inventor
Karl Lauer

Nov. 8, 1927.

K. LAUER

PRECISION INDICATOR

Filed Dec. 9, 1924

Inventor
Karl Lauer
By Knight Bros
attys.

Patented Nov. 8, 1927.

1,648,138

UNITED STATES PATENT OFFICE.

KARL LAUER, OF ESSEN, GERMANY, ASSIGNOR TO FRIED. KRUPP AKTIENGESELL-SCHAFT, OF ESSEN-ON-THE-RUHR, GERMANY.

PRECISION INDICATOR.

Application filed December 9, 1924, Serial No. 754,846, and in Germany March 27, 1924.

This invention relates to precision indicators of the kind having their lever mounted on blades. In order to secure a perfect operation of precision indicators of this kind it is essential that in the middle position of the pointer a plane supposed to be laid across the summits of the notches or blades is accurately perpendicular with respect to the longitudinal axis of the pointer. In order to attain this, the notches or blades must be adjustable with relation to each other in the direction of the longitudinal axis of the pointer. Besides, for accurately regulating the deflection of the pointer, it must be possible to change the distance between the notches or blades. Precision indicators are well known in which only the distance of the notches can be changed. In another well-known precision indicator the notches may besides be brought into a plane extending perpendicularly with relation to the longitudinal axis of the pointer. However, with the last-mentioned precision indicator the two adjustments always take place in dependence of each other and it is therefore very troublesome to secure a perfect working of this precision indicator. The present invention has for its object to obviate this drawback.

An embodiment of the subject-matter of the invention is illustrated in the accompanying drawing in which.

Figure 2:
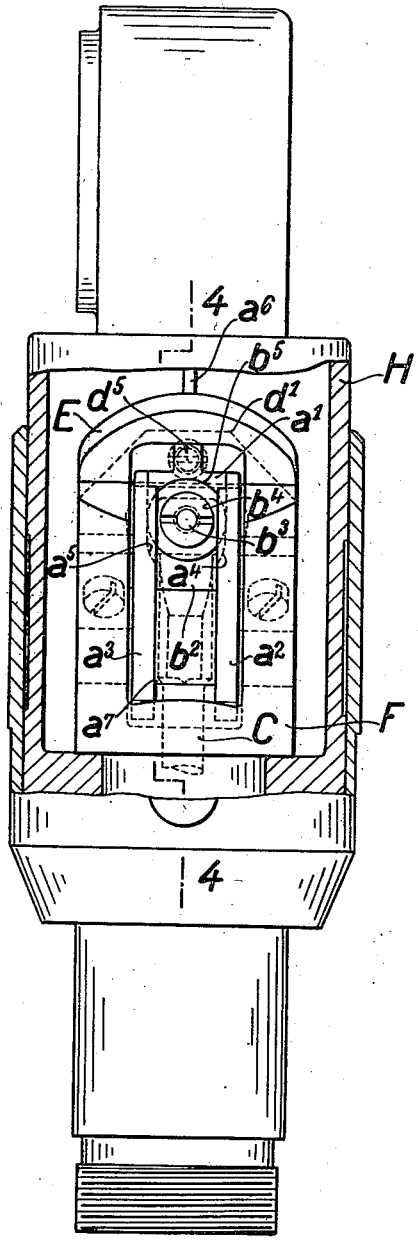
Fig. 2 is a side elevation of Fig. 1, seen from the right, some parts being broken away.
Figure 1:
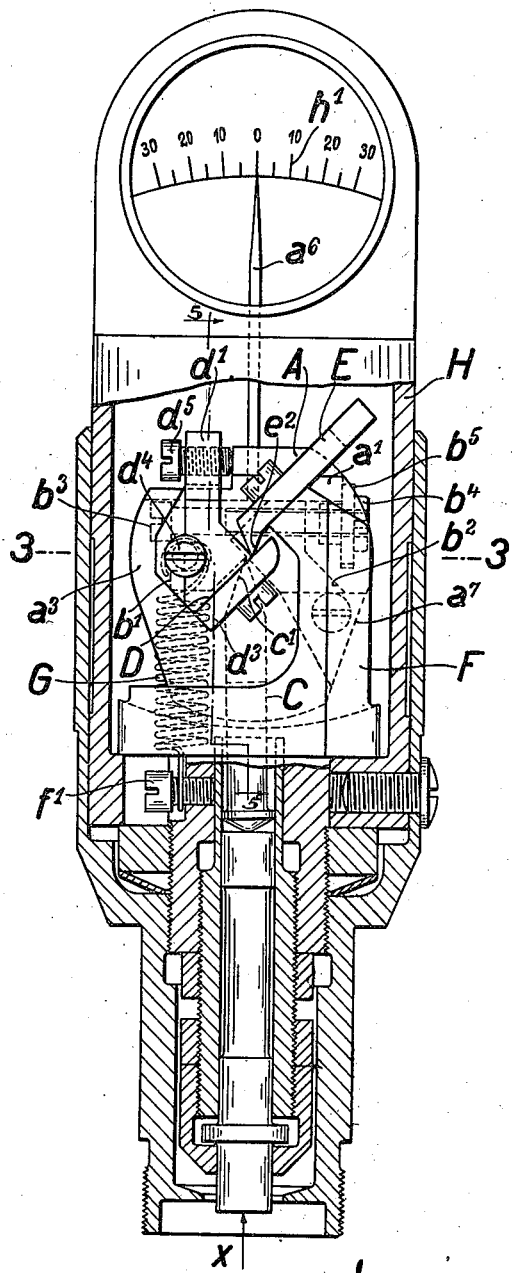
Fig. 1 is a front elevation, partly in section, of the precision indicator.
Figure 3:
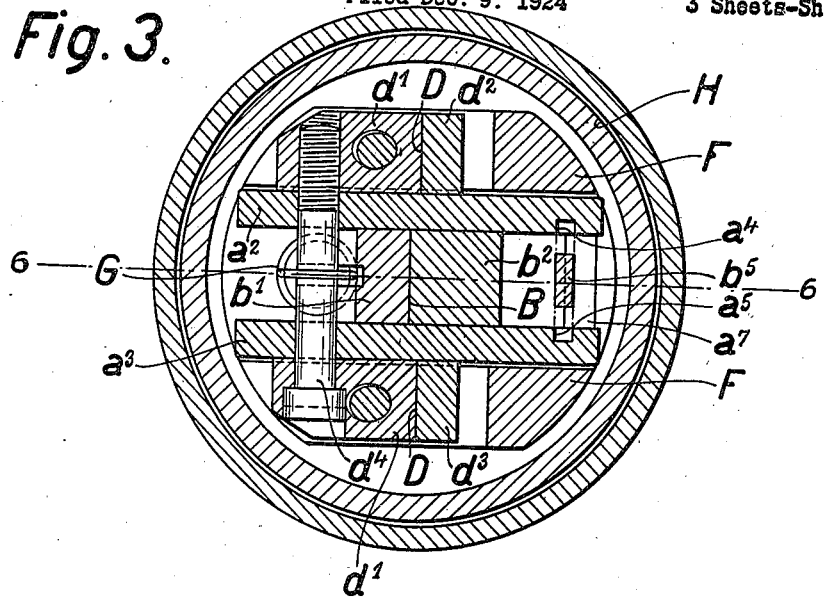
Fig. 3 is a section, on an enlarged scale, along the line 3—3 of Fig. 1, seen from above.
Figure 4:
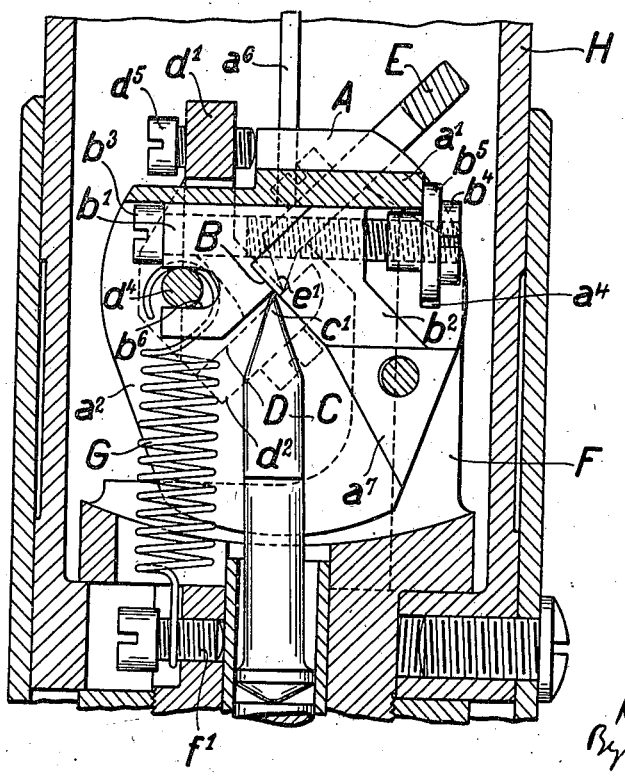
Fig. 4 is a section, likewise on an enlarged scale, along the line 4—4 of Fig. 2, seen from the left.
Figure 5:
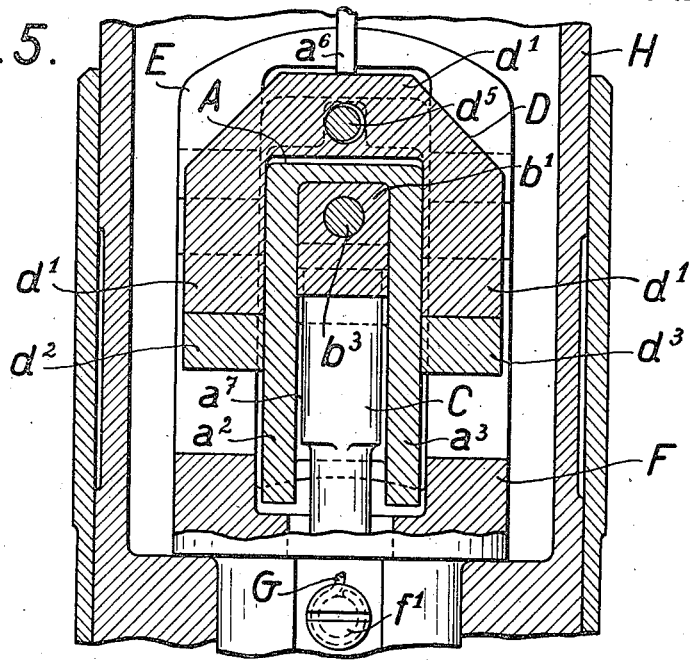
Fig. 5 is a vertical section on the line 5—5 of Fig. 1.
Figure 6:
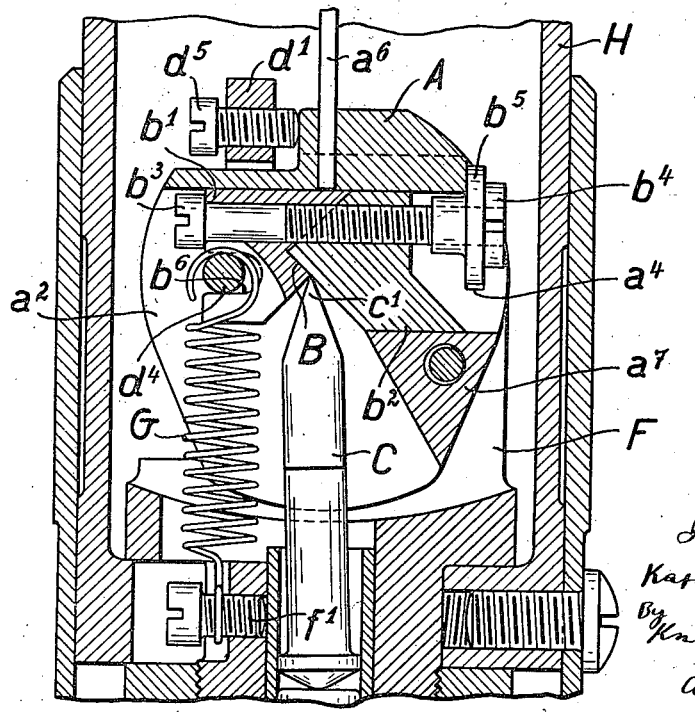
Fig. 6 is a central longitudinal section taken on the line 6—6 of Fig. 3.

In a pointer shoe A (Figs. 1 and 4) which carries a pointer $a^6$ and which consists of two cheeks $a^2$ and $a^3$ connected with each other by a cross-piece $a^1$, is closely guided the body B of a blade-bearing (see particularly Figs. 4 and 6) which consists of two halves $b^1$ and $b^2$. The blade-bearing $b^1 b^2$ is engaged by the blade $c^1$ of a stilt C which is in connection with the feeling bolt, not shown, of the gage. The two halves $b^1$ and $b^2$ are rigidly connected with each other by means of a screw bolt $b^3$ the free end of which carries an adjusting nut $b^4$ which by means of a collar $b^5$ engages recesses $a^4$ and $a^5$ of the pointer shoe A and abuts against the crosspiece $a^1$. By rotating the nut $b^4$ the body B may be adjusted perpendicularly with relation to the base line of the blade-bearing and to the longitudinal axis of the pointer $a^6$. Arranged between the two cheeks $a^2$ and $a^3$ of the pointer shoe A is a filling piece $a^7$ which determines the distance between the lower cheek portions and serves as a guide for the part $b^2$ of the blade-bearing when adjusting the body B by the adjusting nut $b^4$ (see particularly Fig. 6). The body D of the second blade-bearing consists of a fork $d^1$ embracing the pointer shoe A from above and of two plates $d^2$ and $d^3$ screwed each to one of the ends of the fork $d^1$. The body D is carried for rocking motion by a screw bolt $d^4$ which is mounted in the shoe A and on which the half $b^1$ of the bearing B is positively guided by means of a slot $b^6$ (Figs. 4 and 6). The rocking of the blade-bearing body D is performed by means of an adjusting screw $d^5$ mounted in the traverse of the fork $d^1$ and bearing against the pointer shoe A. The geometrical axis of the screw $d^4$ and the base line of the blade-bearing $b^1 b^2$ always lie in a single plane extending perpendicularly with relation to the longitudinal axis of the pointer, since their position in relation to the pointer is fixed by the lower surface of the cross piece $a^1$. It will be readily understood from the drawings that, by suitably rotating the screw $d^5$, the base line of the blade-bearing $d^1 d^2$, $d^1 d^3$ may likewise be brought into the said plane. The blade-bearing $d^1 d^2$, $d^1 d^3$ is engaged by blades $e^1$ and $e^2$ of a bow E which is fastened to a blade carrier F mounted in the casing H of the precision indicator. Connected to the screw $d^4$ and to a screw $f^1$ of the blade carrier F is a tension spring G which tends to rotate the lever A B D around the fixed blades $e^1$ and $e^2$ contrary to the pressure transmitted by the feeling bolt to the stilt C in the direction of the arrow $x$ (Fig. 1). The casing H of the precision indicator is provided in the usual manner with a scale $h^1$ (Fig. 1) in front of which moves the pointer $a^6$.

From the foregoing it will be seen that the pointer $a^6$ can be centered on the scale $h^1$ by adjustment of the screw $d^5$, and that the amount of deflection of the pointer can be adjusted by adjusting the distance between the base-lines of the two blade bearings by rotating the nut $b^4$. This second adjustment is permitted by the mounting of the stilt C which permits it to rock.

I claim:

1. In a precision indicator, comprising a pointer and a lever mounted on blades, blade-bearings arranged on the lever, means for adjusting the said bearings with relation to each other perpendicularly to the base-lines of the blade-bearings and to the longitudinal axis of the pointer, and means for adjusting the bearings with relation to each other in the direction of the said pointer axis.

2. In a precision indicator, comprising a pointer and a lever mounted on blades, two blade-bearings arranged on the lever, one of the bearings being adjustable in a direction perpendicular with relation to the base-line of the blade-bearing and to the longitudinal axis of the pointer and the other bearing being adjustable in the direction of the said axis.

3. In a precision indicator, comprising a pointer and a lever mounted on blades, two blade-bearings arranged on the lever, one of the bearings being adjustable in a direction perpendicular with relation to the base-line of the blade-bearing and to the longitudinal axis of the pointer and the other bearing being adjustable in the direction of the said axis, the last-said bearing being mounted for rocking motion around an axis which lies with the base line of the other bearing in a common plane extending perpendicularly with relation to the longitudinal axis of the pointer.

4. In a precision indicator, comprising a pointer and a lever mounted on blades, two blade-bearings arranged on the lever, one of the bearings being adjustable in a direction perpendicular with relation to the base line of the blade-bearing and to the longitudinal axis of the pointer and the other bearing being adjustable in the direction of the said axis, the means for adjusting the first-said bearing consisting of a screw-threaded bolt extending through and being in threaded engagement with the bearing and provided with a nut which is cooperatively connected with a non-adjustable portion of the lever.

5. In a precision indicator, comprising a pointer and a lever mounted on blades, one of said blades being stationary and the other movable in a direction perpendicular to the longitudinal axis of the pointer and the edges of said blades, blade bearings arranged on said lever for co-operation with said blades, means for adjusting the bearing which cooperates with said movable blade in a direction perpendicular to the longitudinal axis of the pointer and to the edges of the blades, and means for adjusting the bearings with relation to each other in the direction of said pointer axis.

The foregoing specification signed at Essen, Germany, this 6th day of November, 1924.

KARL LAUER.